US006161983A

United States Patent [19]

Berger et al.

[11] Patent Number: 6,161,983

[45] Date of Patent: Dec. 19, 2000

[54] DEVICE FOR FIXING COMPONENTS

[75] Inventors: Johannes Berger, Winnenden; Johannes Koban, Stuttgart; Olaf Klemd, Markgroeningen, all of Germany

[73] Assignee: Robert Bosch GmbH, Stuttgart, Germany

[21] Appl. No.: 09/180,976

[22] PCT Filed: Mar. 24, 1998

[86] PCT No.: PCT/DE98/00843

§ 371 Date: Nov. 18, 1998

§ 102(e) Date: Nov. 18, 1998

[87] PCT Pub. No.: WO98/45083

PCT Pub. Date: Oct. 15, 1998

[30] Foreign Application Priority Data

Apr. 7, 1997 [DE] Germany ........................... 197 14 193

[51] Int. Cl.[7] ........................................................ F16B 5/12

[52] U.S. Cl. ............................ 403/294; 403/341; 403/24

[58] Field of Search .................................... 403/381, 292, 403/294, 24, 25, 373, 375, 341; 137/884, 271

[56] References Cited

U.S. PATENT DOCUMENTS

| | | | |
|---|---|---|---|
| 1,126,351 | 1/1915 | Beabes | 403/294 X |
| 2,735,146 | 2/1956 | Purviance | 403/294 |
| 4,082,324 | 4/1978 | Obrecht | 137/271 X |
| 4,535,821 | 8/1985 | Anderson | 137/884 |
| 5,531,539 | 7/1996 | Crawford | 403/381 |
| 5,681,126 | 10/1997 | Lin | 403/292 X |

FOREIGN PATENT DOCUMENTS

| | | |
|---|---|---|
| 0 645 215 | 3/1995 | European Pat. Off. . |
| 834 802 | 3/1952 | Germany . |
| 36 05 166 C2 | 2/1990 | Germany . |
| 40 10 840 A1 | 10/1991 | Germany . |
| 41 39 669 A1 | 6/1993 | Germany . |

OTHER PUBLICATIONS

Mechanik Grundelemente, Robert Bosch GMBH, Waiblingen, pp. 2–0 to 2–09, 3–0 to 3–09, Mar. 1992.

"Das Profilsystem Mit Pfiff", Maytec Aluminumsystemtechnik GMBH, Dachau, pp. 4,8,9, May 1989.

*Primary Examiner*—Harry C. Kim
*Attorney, Agent, or Firm*—Michael J. Striker

[57] ABSTRACT

A device (10) for fastening structural elements (20), in particular pneumatic elements, by fastening elements (22) is proposed. The device (10) consists of several, parallel arranged fastening plates (42, 44, 46), which are arranged by means of screws (18) between two profiled rods (14, 16). Sliding blocks (76, 86) are arranged between the individual fastening plates (42, 44, 46) of the device (10) in grooves (74) of the longitudinal sides (66, 68, 70, 72) of the fastening plates (42, 44, 46). The sliding blocks (76, 78) can be arbitrarily positioned in arbitrary numbers, are easy to mount, hide possible gaps and increase the rigidity of the device (10).

10 Claims, 3 Drawing Sheets

DEVICE FOR FIXING COMPONENTS

BACKGROUND OF THE INVENTION

The invention relates to a device for fastening structural elements. A fastening plate is already known from EP 0 645 215 B1, which can be connected to additional fastening plates by means of connecting arrangements. The connecting arrangements have the shape of a double-T and are anchored in T-shaped grooves, which are located opposite each other and formed on the longitudinal sides of the fastening plates.

The fastening plates are produced by means of an aluminum extrusion molding process. With thin fastening plates in particular, warping as a result of the production process can lead to the creation of gaps between the rows of fastening plates. In addition, the individual fastening plates are not very rigid, so that they can become bent when the structural elements are fastened. In order to close the gaps on the one hand and, on the other hand, to increase the rigidity of the device, it is necessary to fill the T-grooves of the longitudinal sides, which are located opposite each other, completely with coupling elements. This leads to elaborate assembly operations, in particular when using coupling elements which are seated with press fit in the T-grooves, since each individual coupling element must be pushed with the required force into the fastening plates. If the oppositely situated T-grooves of the fastening plates are not completely filled with coupling elements, and if the latter are slidingly seated, the coupling elements can slide out of place in the T-grooves. Since the coupling elements have a comparatively large volume, the weight is also correspondingly great.

EP 0 645 215 B1 furthermore provides the mounting of the fastening elements on support structures by means of fastening screws and angle brackets. To this end, the angle brackets must first be fastened on the fastening plates by means of screws. In the process, the legs of the angle brackets to be fastened on the support structure must be aligned in such a way that they all lie in one plane. Then the angle brackets can be attached to the support structures by means of further screws. This way of assembling is relatively elaborate.

SUMMARY OF THE INVENTION

In accordance with the present invention the fastening plates are connected with each other by connecting elements which extend at least partially over a length of a row of front faces of the fastening elements, at least one coupling element is provided with an extension, and moldings are formed at least on outer edges of depressions located opposite to one another, which extend around the extension of the at least one coupling element.

In contrast to this, the device in accordance with the invention has the advantage that the device is very rigid, but still easy to mount. The fastening plates can be lined up with each other in a simple manner, since they are fastened with their front faces directly to connecting elements of any arbitrary length. Therefore the surface of the device can be changed in any arbitrary manner, yet only a few parts are required for this. It should be considered to be a further advantage that the coupling elements can be inserted into the depressions without an application of force, but are still fixed in place in the moldings by means of extensions.

It is particularly advantageous to embody the depressions as grooves extending over the entire length of the longitudinal sides, since in this way a cost-effective production of the fastening plates by means of an aluminum extrusion molding process is possible.

It is considered to be a further advantage that, because they are divided into sections of two different widths, the sliding blocks have an even lower weight without the device losing rigidity.

If the sliding block(s) extend(s) over the entire length of the grooves in the longitudinal sides of the fastening plates, a gap, which is created by possible twisting of the fastening plates, is invisible.

As another option for affecting the rigidity of the devices, it is possible to embody bores in the longitudinal sides of the fastening plates, or even to apply them later. Pins are inserted into these bores. In this way the rigidity of the device can be affected later.

Embodied as plastic elements, the coupling elements are cost-effective and light.

BRIEF DESCRIPTION OF THE DRAWINGS

An exemplary embodiment of the invention is represented in the drawings and will be explained in greater detail in the following description. Shown are in.

DESCRIPTION OF THE PREFERRED EMBODIMENT

Figure 1:
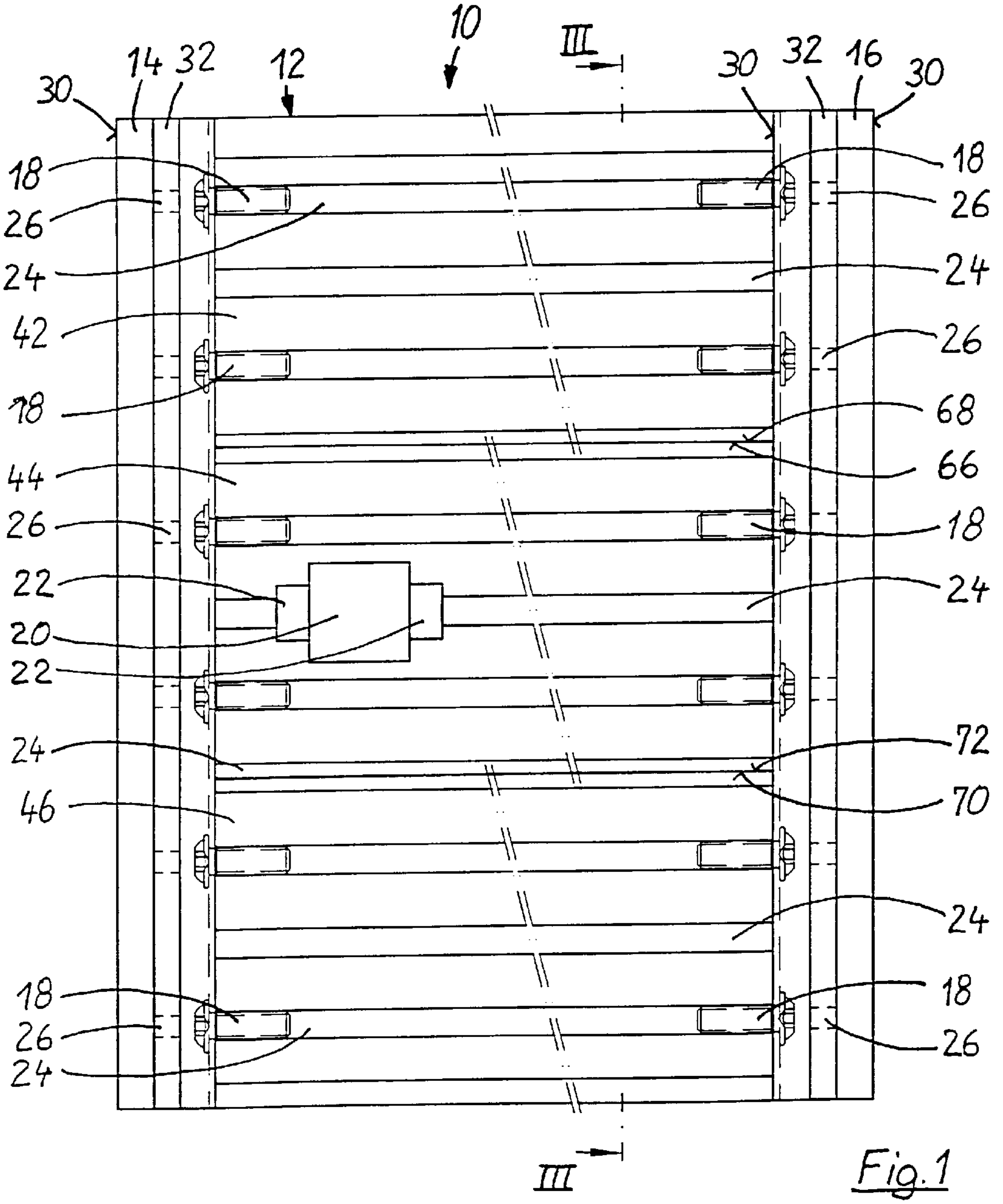
FIG. 1, a front view of a device for fastening structural elements.

FIG. 1 shows a device 10 for fastening structural elements. The device 10 has a holding plate 12, which is fastened at its front faces by means of screws 18 between two profiled rods 14, 16 embodied in the same way. A structural element 20 is attached to the front 19 of the holding plate 12 by means of two generally known fastening elements 22. The holding plate 12 has undercut grooves 24, arranged at even distances and extending from one front face to the other, in which the fastening elements 22 are anchored. The front faces of the profiled rods 14, 16 end flush with the holding plate 12. Transverse bores 26, used for fastening the holding plate 12 on the profiled rods 14, 16, are formed in each one of the profiled rods 14, 16.

Figure 2:
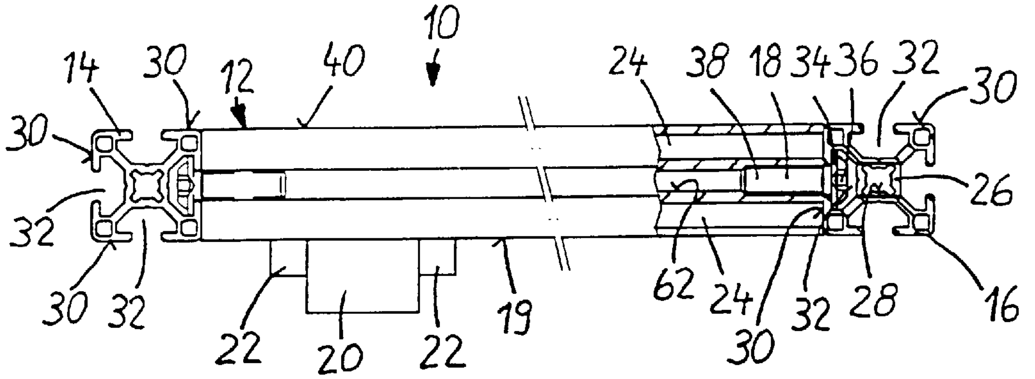
FIG. 2, a partially broken-open view from above on the device in FIG. 1, FIG. 3, a section along the section line III—III in FIG. 1, FIG. 4, an enlarged detail from FIG. 3, FIG. 5, a front view of a sliding block, FIG. 6, a lateral view of a sliding block, FIG. 7, a front view of a changed sliding block, and FIG. 8, a view from above on the changed sliding block.

FIG. 2 shows that the thickness of the holding plate 12 corresponds to the width of an exterior surface 30 of the profiled rod 14, 16. The profiled rod 14, 16 has a square cross section and a centrally extending longitudinal bore 28. An undercut groove 32 extends, centered in the longitudinal direction, on each one of of the exterior surfaces 30 of the rods 14, 16. The screw head 34 of a screw 18 is arranged flush with each transverse bore 26 in the groove 32 facing the holding plate 12. The screw head 34 lies in the undercut of the groove 12 and has a hexagonal socket 36. The threaded shank 38 of the screw 18 is screwed into the holding plate 12, which will be covered in more detail later. A screwdriver which fits the hexagon socket 36 can be inserted through the transverse bores 26 for tightening the screws 18 in the holding plate 12.

Figure 3:
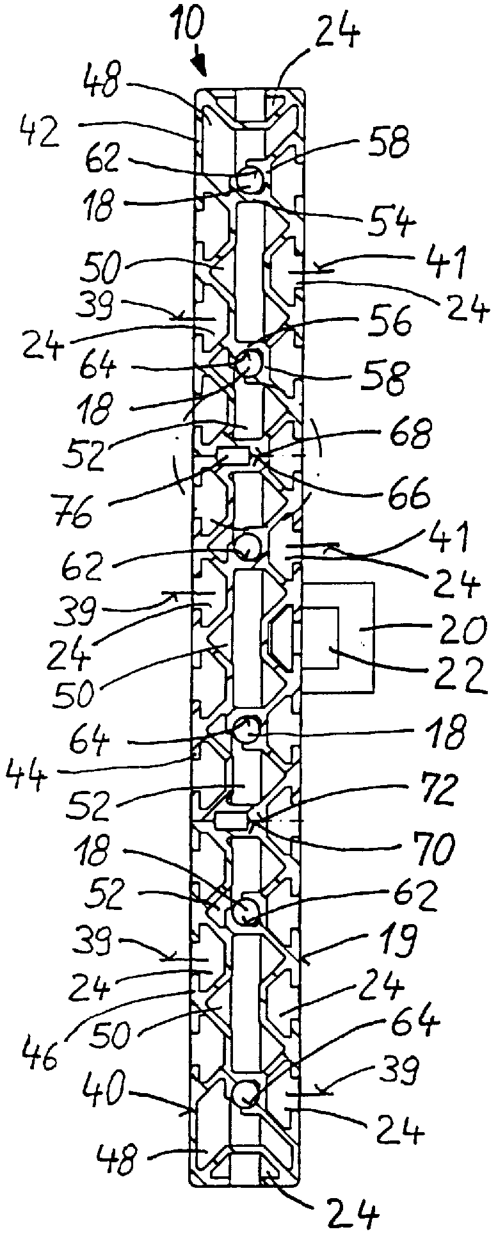

From FIG. 3 it can be seen that undercut grooves 24 are cut into the front 19 as well as the back 40 of the holding plate 12. The axis of symmetry 39 of a groove 24 on the back 40 is located in the center between the axes of symmetry 41 of two grooves 24 on the front 19.

The holding plate 12 consists of three fastening plates 42, 44, 46 of equal width and equal length. In their interior, the fastening plates 42, 44, 46 each have three hollow spaces 48, 50, 52, which are separated from each other by webs 54, 56. The webs 54, 56 extend from the edge of the groove bottom 58 of a groove 24 on the front 19 to the edge of the groove bottom 60 of a groove 24 on the back 40. A screw channel 62, or respectively 64, has been integrated into the respective corner formed by the web 54, or respectively 56, and the groove bottom 58, or respectively 50. The screw channels 62 and 64 are open toward the hollow spaces 48 and 52. The threaded shank 38 of a screw 18 is located at the front in each screw channel 62, 64.

Respectively one further undercut groove 24, which can be used for fastening purposes, is cut into the two outer fastening plates 42, 46 on the longitudinal sides of the two outer fastening plates 42, 46 facing away from the center fastening plate 44.

A longitudinal side 66 of the fastening plate 42 faces a longitudinal side 68 of the fastening plate 44, and a longitudinal side 70 of the fastening plate 44 faces a longitudinal side 72 of the fastening plate 46. A continuous groove 74 is respectively formed in each longitudinal side 66, 68, 70, 72 in the longitudinal direction of the longitudinal sides 66, 68, 70, 72. The individual grooves 74 of the longitudinal sides 66, 68, 70, 72 are flush with each other. Sliding blocks 76, 86 are arranged in them.

Figure 4:
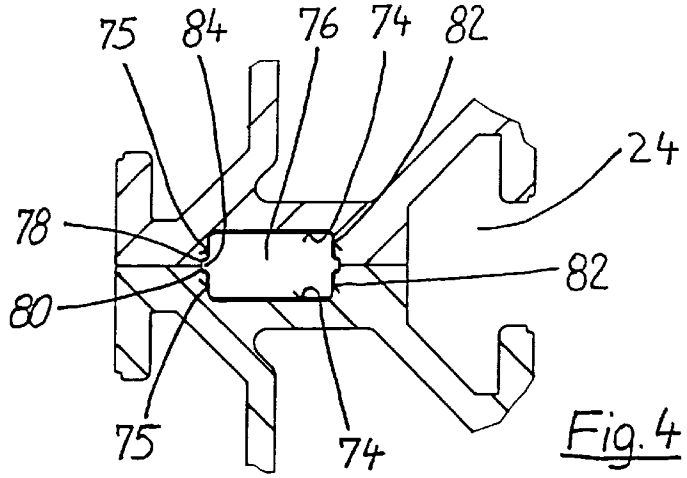
Figure 5:
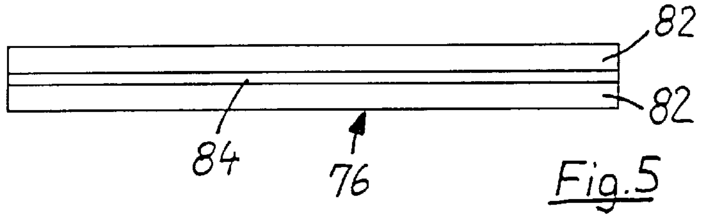
Figure 6:
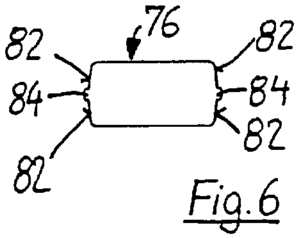

FIG. 4 represents the arrangement of a sliding block 76 and two oppositely arranged grooves 74. The grooves 74, whose width is greater than their depth, have lateral walls 75, which taper toward the groove bottom, and have rounded inner edges. Each outer edge 78 of the two grooves 74 has a molding 80 in the shape of a quarter circle. With fastening plates 42, 44 lined up with each other, the moldings 80, which are now located opposite each other, constitute a semicircle. The sliding block 76 has a cross section which corresponds to the shape of two grooves 74 located opposite each other. This means that, because of the two grooves 74 tapering toward the groove bottom, the sliding block 76 has an approximately hexagonal shape, as can also been seen in FIG. 6, with flanks 82 which taper in the direction toward the groove bottom of the grooves 74. Furthermore, respectively one extension 84 in the shape of a semicircle is formed in the two outer edges of the sliding block 76, which in the assembled state of the device 10 are located in the moldings 80. FIG. 5 shows that the two extensions span the entire length of the sliding block 76. In the assembled state of the device 10, the two extensions 84 are enclosed by the moldings 80. The cross section of the sliding block 84 is constant over its entire length.

Figure 7:
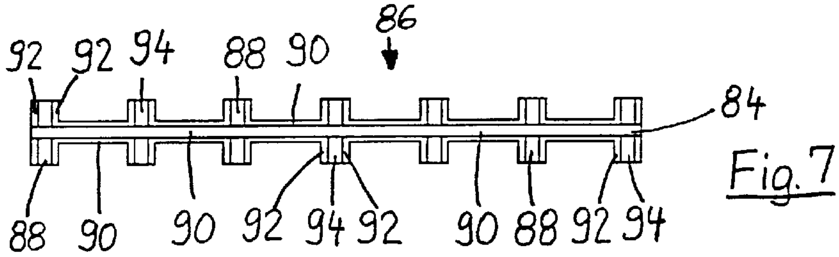
Figure 8:
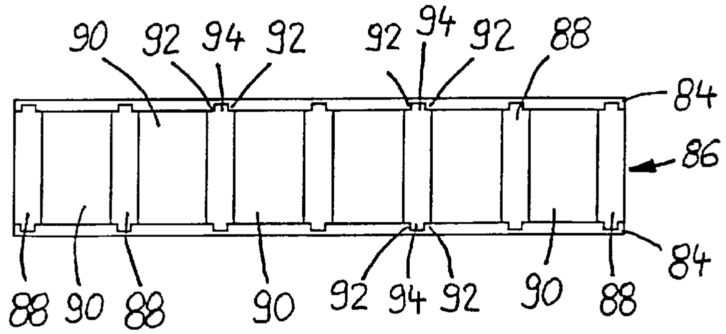

A changed sliding block 86 is represented in FIGS. 7 and 8. It is composed of several first sections 88, which partially have the cross section of the sliding block 76, and second sections 90, which connect the first sections 88. The extensions 84 also span the entire length of the sliding block 86. The second sections 90 are approximately twice as long as the first sections 88. Furthermore, the second sections 90 are narrower than the first sections 88 such, that they do not extend as far into the groove bottom of the grooves 74 as the first sections 88. The first sections 88 also have flanks 82, which taper in the direction toward the groove bottom of the grooves 74. However, as can be seen from FIG. 8, recesses 92 extending vertically in respect to the groove bottom of the grooves 74 have been formed at the edges of the flanks 82 which would be in contact with the lateral walls 75 of the grooves 74. Therefore only thin webs 94 remain of the flanks 82, which are 0.8 mm to 1 mm wide. Therefore the surface of the sliding blocks 86 which is in contact with the lateral walls 75 of the grooves 74 is very small. The reason for this is as follows: when the fastening plates 44 and 46 are combined, a certain force is exerted on them when they are lined up with each other, so that they lie flush against each other. This force is transmitted in turn by the lateral walls 75 of the grooves 74 to the webs 94 of the sliding blocks 86. Since the webs 94 are very thin, they can be plastically deformed when the fastening plates 44, 46 are greatly warped. A certain tolerance compensation is possible by means of this.

In the course of assembling the device, the sliding blocks 76, 86 are arranged in the grooves 74. Because of the shape of the grooves 74 it is possible in a simple way to insert the sliding blocks 76, 86 first into the longitudinal side 72 of the fastening plate 46. The sliding blocks are aligned by means of the moldings 80 and extensions 84. As soon as the fastening plate 44 is placed down flush and both fastening plates 44, 46 are anchored in the profiled rods 14, 16, the flanks 82 of the sliding blocks 76, 86 are fixed in place by the lateral walls 75 of the grooves 74.

The sliding blocks 76, 86 can be positioned at any arbitrary location in the groove 74. Because of this an adaptation to different situations is possible. If, for example, the fastening plates 42, 44, 46 are very thin, greatly warped and have gaps between the individual fastening plates 42, 44, 46, the entire length of the grooves 74 is filled with sliding blocks 76, 86. Because of this, on the one hand no gaps are visible anymore and, since the individual fastening plates 42, 44, 46 are supported on each other by means of the sliding blocks 76, 86, the rigidity of the device is increased on the other hand. If the fastening plates 42, 44, 46 are thicker and less warped, one sliding block 76, 78 might be sufficient.

The fastening plates 42, 44, 46 can be produced cost-effectively and in any desired length by means of an aluminum extrusion molding process.

The sliding block 76 can be produced by means of a process of plastic processing—extruding—similar to the aluminum extrusion process. Because of this it is also possible to produce parts of any desired length.

Because of the not constant cross-sectional shape, the sliding block 86 is produced by means of an injection molding process. It can also be produced as a part made by an aluminum diecasting process. In this case the not constant cross section saves weight.

In place of grooves 74 it is also possible to form bores with depressions in the longitudinal sides of the fastening plates. Pins, which have a circumferential collar in the center, are used as coupling elements.

What is claimed is:

1. A device for fastening structural elements, comprising fastening plates provided with grooves for fastening the structural elements on at least one plate surface and with depressions on at least one longitudinal side; at least one coupling element which engages the depressions located opposite to each other; connecting elements which connect said fastening plates with each other and extend at least partially over a length of front faces of said fastening plates, said at least one coupling element having at least one extension, said depressions located opposite to each other being provided with recessed moldings formed at least on outer edges of the depressions which, when the fastening plates are located in a row one against the other, extend opposite to one another and around said at least one extension of said at least one coupling element from opposite sides.

2. A device as defined in claim 1, wherein said oppositely located depressions are grooves which extend over an entire length of longitudinal sides of said fastening plates, said at least one coupling element being formed as a sliding block.

3. A device as defined in claim 1, wherein said at least one coupling element has a shape corresponding to a shape of said depressions in the longitudinal sides of said fastening plates.

4. A device as defined in claim 1, wherein said at least one coupling elements has several sections formed so that a shape of one of said sections corresponds to a shape of said depressions in a longitudinal side of said fastening plates, while another of said sections has a lesser width than said one section, said extension spans at least one of said sections.

5. A device as defined in claim 1, wherein said out least one coupling element extends over a length of said depressions.

6. A device as defined in claim 1, wherein said at least one extension spans an entire length of said at least one coupling element.

7. A device as defined in claim 1, wherein said depressions are formed as bores, said at least one coupling element being formed as a pin, said extension being formed as a collar passing around said pin.

8. A device as defined in claim 1, wherein said out least one coupling element is composed of a plastic material.

9. A device as defined in claim 1, wherein said fastening plates are formed as aluminum extrusion molding elements.

10. A device for fastening structural elements, comprising fastening plates provided with grooves for fastening the structural elements on at least one plate surface and with depressions on at least one longitudinal side; at least one coupling element which engages the depressions located opposite to each other; connecting elements which connect said fastening plates with each other and extend at least partially over a length of front faces of said fastening plates, said at least one coupling element having at least one extension, said depressions located opposite to each other being provided with moldings which, when the fastening plates are located in a row one against the other, extend opposite to one another and around said at least one extension of said at least one coupling element, said at least one coupling element having a shape corresponding to a shape of said depressions in the longitudinal sides of said fastening plates, said at least one coupling elements having several sections formed so that a shape of one of said sections corresponds to a shape of said depressions in a longitudinal side of said fastening plates, while another of said sections has a lesser width than said one section, said extension spans at least one of said sections.

* * * * *